United States Patent [19]

Yamaguchi et al.

[11] Patent Number: 4,716,134
[45] Date of Patent: Dec. 29, 1987

[54] DIELECTRIC CERAMIC COMPOSITION

[75] Inventors: Takashi Yamaguchi; Isao Ishiguchi, both of Chichibu; Takeshi Inoue, Sakura, all of Japan

[73] Assignee: Mitsubishi Mining and Cement Co., Ltd., Tokyo, Japan

[21] Appl. No.: 930,581

[22] Filed: Nov. 12, 1986

[30] Foreign Application Priority Data

Dec. 10, 1985 [JP] Japan .................................. 60-277610

[51] Int. Cl.$^4$ .............................................. C04B 35/46
[52] U.S. Cl. ...................................... 501/136; 501/135
[58] Field of Search ................................. 501/136, 135

[56] References Cited

U.S. PATENT DOCUMENTS 4,216,102  8/1980  Furukawa et al. ................... 501/135

FOREIGN PATENT DOCUMENTS 0116662  9/1980  Japan ................................... 501/135
6103802  8/1981  Japan ................................... 501/135
0032303  2/1983  Japan ................................... 501/136
0176969  9/1985  Japan ................................... 501/136

Primary Examiner—William R. Dixon, Jr.
Assistant Examiner—James M. Hunter, Jr.
Attorney, Agent, or Firm—Frank J. Jordan; C. Bruce Hamburg; Manabu Kanesaka

[57] ABSTRACT

There is provided a dielectric ceramic composition which comprises $(Pb,La)(Zr,Ti)O_3$ and $Pb(Mg_{1/3}Nb_{2/3})O_3$ in the ratio defined by the formula below.

$$x(Pb_{1-u}La_u)(Zr_{1-v}Ti_v)O_3 \cdot (1-x)Pb(Mg_{1/3}Nb_{2/3})O_3$$

wherein
$0.10 \leq u \leq 0.28$
$0.25 \leq v \leq 1.00$
$0.03 \leq x \leq 0.50$

8 Claims, No Drawings

DIELECTRIC CERAMIC COMPOSITION

FIELD OF THE INVENTION AND RELATED ART STATEMENT

The present invention relates to a dielectric ceramic composition, and more particularly it is concerned with a ceramic composition having a high dielectric constant, high insulation resistance, and high capacitance-resistance product, which is capable of sintering at a low temperature.

Heretofore, the high-dielectric ceramic composition has been dominated by the one composed mainly of barium titanium ($BaTiO_3$). The $BaTiO_3$-based composition generally contains a shifter to shift the Curie point to the vicinity of room temperature, a depressor to improve the capacitance-temperature characteristics, a sintering promoter, and an anti-reducing agent.

Examples of the shifter include $BaSnO_3$, $BaZrO_3$, $CaZrO_3$, $CaSnO_3$, $SrTiO_3$, $PbTiO_3$, $La_2O_3$, and $CeO_2$. Examples of the depressor include $CaTiO_3$, $MgTiO_3$, $Bi_2(SnO_3)_3$, $Bi_2(TiO_3)_3$, $NiSnO_3$, $MgZrO_3$, and $MgSnO_3$. Examples of the sintering promoter include $Al_2O_3$, $SiO_2$, $ZnO$, $CeO_2$, $B_2O_3$, $Nb_2O_5$, and $WO_3$. Examples of the anti-reducing agent include $MnO_2$, $Fe_2O_3$, and $CuO$.

The composition composed mainly of barium titanate has some disadvantages. For example, the high sintering temperature (1300° to 1400° C.) constitutes a drawback to the sintering operation. The necessity of using a high-melting noble metal such as Pd and Pt for the internal electrodes constitutes another drawback to cost reduction. This is true of the case where the composition is applied to layer-built capacitors.

For reasons mentioned above, there has been a demand for a dielectric material for layer-built capacitors capable of sintering at a low temperature which will permit the internal electrodes to be made of an inexpensive silver-based material. It will contribute to the reduced production cost of layer-built capacitor.

OBJECT AND SUMMARY OF THE INVENTION

It is an object of the present invention to provide a ceramic composition capable of sintering at a low temperature which has a high dielectric constant, high insulation resistance, and high capacitance-resistance product.

It is another object of the invention to provide a ceramic composition which can be made at a low cost into small-sized large-capacity capacitors of high reliability.

This object is achieved by a dielectric ceramic composition which comprises $(Pb,La)(Zr,Ti)O_3$ and $Pb(Mg_{1/3}Nb_{2/3})O_3$ in the ratio defined by the formula below.

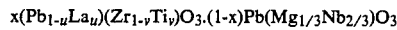

wherein
$0.10 \leq u \leq 0.28$
$0.25 \leq v \leq 1.00$
$0.03 \leq x \leq 0.50$

DETAILED DESCRIPTION OF PREFERRED EMBODIMENTS

The dielectric ceramic composition of this invention contains $(Pb,La)(Zr,Ti)O_3$ and $Pb(Mg_{1/3}Nb_{2/3})O_3$. The ratio of the components is defined by the formula (I).

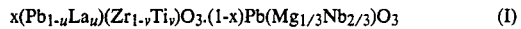

wherein
$0.10 \leq u \leq 0.28$
$0.25 \leq v \leq 1.00$
$0.03 \leq x \leq 0.50$

The ceramic composition of this invention may contain, in addition to the above-mentioned components, $Pb(Fe_{2/3}W_{1/3})O_3$ in an amount of 0 to 9 mol%, preferably 0 to 8 mol%, and at least one member selected from the group consisting of $Pb(Mg_{1/2}W_{1/2})O_3$, $Pb(Ni_{1/2}W_{1/2})O_3$, and $Pb(Fe_{2/3}W_{1/3})O_3$ (excluding the case of $Pb(Fe_{2/3}W_{1/3})O_3$ alone) in an amount of less than 5 mol%, preferably 0 to 4 mol%, in total.

The ceramic composition of this invention should contain the components in the specified ratio for reasons given below.

If the value of u defined in the formula (I) above is less than 0.1, the resulting composition is low in insulation resistance and capacitance-resistance product; and if it is higher than 0.28, the composition decreases in Curie point and dielectric constant. Thus the value of u should be in the range of 0.10 to 0.28 both inclusive, and preferably in the range of 0.10 to 0.25 both inclusive.

If the value of v defined in the formula (I) above is less than 0.25, the resulting composition is high in sintering temperature. Thus the value of v should be in the range of 0.25 to 1.00 both inclusive, and preferably in the range of 0.30 to 1.00 both inclusive.

If the value of x defined in the formula (I) above is less than 0.03, the resulting composition is low in insulation resistance and capacitance-resistance product; and if it is greater than 0.50, the resulting composition has a low dielectric constant. Thus the value of x should be in the range of 0.03 to 0.50 both inclusive, and preferably in the range of 0.03 to 0.40 both inclusive.

If the composition of the invention contains at least one member selected from the group consisting of $Pb(Fe_{2/3}W_{1/3})O_3$, $Pb(Mg_{1/2}W_{1/2})O_3$, and $Pb(Ni_{1/2}W_{1/2})O_3$, it has a low sintering temperature.

If the composition contains $Pb(Fe_{2/3}W_{1/3})O_3$ alone in an amount more than 9 mol% or if the composition contains either $Pb(Mg_{1/2}W_{1/2})O_3$ or $Pb(Ni_{1/2}W_{1/2})O_3$, or two or more members selected from the above-mentioned group in an amount more than 5 mol% (in total in the case of two or more members), it has a low dielectric constant, which is undesirable.

The dielectric ceramic composition of this invention as defined above is produced in the following manner. At first the raw material powders such as lead oxide, lanthanum oxide, zirconium oxide, titanium oxide, magnesium oxide, and niobium oxide are weighed according to a prescribed ratio. They are thoroughly mixed using a wet ball mill. The resulting mixture is dried and, if necessary, calcined at 700° to 850° C. This calcination is not a must; but it makes the particles uniform and improves the dielectric properties. The calcined raw material powder is pulverized further with a wet ball mill, dried, and granulated with a binder such as polyvinyl alcohol. The granules are press-formed into a desired shape, followed by firing. The firing is performed at 1000° to 1200° C. for several hours.

The dielectric ceramic composition of this invention which is defined as mentioned above has a high dielectric constant, a high insulation resistance, a high capacitance-resistance product, and a low dielectric loss. Because of these outstanding characteristic properties, the dielectric ceramic composition can be made into small-sized high-capacity ceramic capacitors of high reliability.

In addition, the dielectric ceramic composition of this invention contributes to the reduced production cost of layer-built ceramic capacitors because it can be fired at a low temperature. The firing at a low temperature permits the internal electrodes of layer-built ceramic capacitors to be made of a comparatively inexpensive silver-based material.

The invention is now described in more detail with reference to the following examples, which are not intended to limit the scope of the invention.

with a wet ball mill for 20 hours, followed by dehydration and drying.

After mixing with an organic binder, the resulting powder was compression-molded into disks, 16 mm in diameter and 0.8 mm thick, under a pressure of 3 tons/cm². The greenware was fired in a magnesia ceramic vessel for 1 hour at a firing temperatures in the range of 1000° to 1140° C. as shown in Table 1.

The resulting dielectric disks were examined for electrical properties, with silver electrodes formed by firing at 700° to 800° C. on both sides of each sample. The results are shown in Table 1.

The dielectric constant and dielectric loss were measured with a YHP digital LCR meter, Model 4274A, at a frequency of 1 kHz and a voltage of 1.0 $V_{rms}$. The insulation resistance was measured with a YHP insulation resistance tester, Model 4329A, at 100 V for 1 minute.

Incidentally, symbols A, B, and C in Table 1 represent $Pb(Fe_{2/3}W_{1/3})O_3$, $Pb(Mg_{1/2}W_{1/2})O_3$, and $Pb(Ni_{1/2}W_{1/2})O_3$, respectively.

TABLE 1

| Sample No. | Dielectric Ceramic Composition Values in Formula I | | | others mol % | Sintering temperature (°C.) | Electrical Properties | | | |
|---|---|---|---|---|---|---|---|---|---|
| | x | u | v | | | Dielectric constant | Dielectric loss (%) | Insulation resistance (Ω) | Capacitance-resistance product (MΩ · μF) |
| 1* | 0 | — | — | | 1080 | 5540 | 0.31 | $1.6 \times 10^{11}$ | 1160 |
| 2* | 0.03 | 0 | 1.00 | | 1080 | 8170 | 0.58 | $0.9 \times 10^{11}$ | 980 |
| 3 | 0.05 | 0.20 | 1.00 | | 1080 | 7610 | 0.27 | $2.1 \times 10^{11}$ | 2140 |
| 4* | 0.05 | 0.40 | 1.00 | | 1080 | 5270 | 0.41 | $3.5 \times 10^{11}$ | 2420 |
| 5* | 0.15 | 0.07 | 1.00 | | 1080 | 8360 | 6.30 | $0.8 \times 10^{11}$ | 890 |
| 6 | 0.15 | 0.13 | 1.00 | B = 3 | 1080 | 11350 | 1.82 | $2.3 \times 10^{11}$ | 3490 |
| 7 | 0.15 | 0.13 | 1.00 | C = 3 | 1030 | 8300 | 0.56 | $2.2 \times 10^{11}$ | 3560 |
| 8 | 0.15 | 0.13 | 1.00 | A = 5 | 1030 | 12410 | 0.50 | $2.4 \times 10^{11}$ | 5800 |
| 9 | 0.15 | 0.20 | 1.00 | | 1080 | 7750 | 0.38 | $4.5 \times 10^{11}$ | 4660 |
| 10 | 0.25 | 0.20 | 1.00 | | 1100 | 8590 | 0.55 | $2.0 \times 10^{11}$ | 2300 |
| 11 | 0.25 | 0.28 | 1.00 | | 1100 | 6100 | 0.60 | $6.5 \times 10^{11}$ | 5300 |
| 12* | 0.25 | 0.32 | 1.00 | | 1100 | 4530 | 0.50 | $7.5 \times 10^{11}$ | 4550 |
| 13 | 0.35 | 0.23 | 1.00 | A = 2 | 1100 | 7200 | 1.06 | $2.4 \times 10^{11}$ | 2310 |
| 14 | 0.35 | 0.23 | 1.00 | B = 1 | 1070 | 6610 | 0.58 | $2.5 \times 10^{11}$ | 3220 |
| 15 | 0.35 | 0.23 | 1.00 | C = 2 | 1070 | 6420 | 0.43 | $2.7 \times 10^{11}$ | 3380 |
| 16 | 0.35 | 0.26 | 1.00 | | 1100 | 6200 | 1.01 | $3.7 \times 10^{11}$ | 3070 |
| 17* | 0.50 | 0.08 | 1.00 | | 1100 | 4260 | 5.35 | $0.7 \times 10^{11}$ | 400 |
| 18 | 0.50 | 0.20 | 1.00 | | 1100 | 6320 | 0.62 | $2.5 \times 10^{11}$ | 2110 |
| 19* | 0.60 | 0.15 | 1.00 | | 1100 | 4810 | 1.80 | $1.2 \times 10^{11}$ | 770 |
| 20 | 0.03 | 0.13 | 0.85 | | 1100 | 7230 | 0.32 | $2.2 \times 10^{11}$ | 2130 |
| 21 | 0.10 | 0.10 | 0.65 | | 1100 | 7110 | 0.84 | $2.8 \times 10^{11}$ | 2660 |
| 22 | 0.10 | 0.10 | 0.65 | B = 2 | 1080 | 6580 | 0.50 | $2.7 \times 10^{11}$ | 3460 |
| 23 | 0.10 | 0.10 | 0.65 | C = 2 | 1100 | 6390 | 0.42 | $2.8 \times 10^{11}$ | 3480 |
| 24 | 0.10 | 0.10 | 0.65 | A = 9 | 1000 | 6080 | 0.27 | $3.0 \times 10^{11}$ | 3550 |
| 25 | 0.15 | 0.20 | 0.65 | | 1100 | 6210 | 0.28 | $3.9 \times 10^{11}$ | 3240 |
| 26 | 0.40 | 0.15 | 0.65 | | 1120 | 6820 | 0.62 | $3.4 \times 10^{11}$ | 3110 |
| 27 | 0.10 | 0.10 | 0.25 | | 1120 | 7130 | 0.58 | $2.3 \times 10^{11}$ | 2190 |
| 28* | 0.15 | 0.33 | 0.25 | | 1140 | 5200 | 0.32 | $6.2 \times 10^{11}$ | 4310 |
| 29* | 0.30 | 0.08 | 0.25 | | 1120 | 4870 | 4.80 | $0.8 \times 10^{11}$ | 520 |
| 30 | 0.30 | 0.12 | 0.25 | | 1140 | 9600 | 0.50 | $4.0 \times 10^{11}$ | 5130 |
| 31 | 0.30 | 0.12 | 0.25 | B = 2 | 1100 | 7200 | 0.51 | $2.4 \times 10^{11}$ | 3020 |
| 32 | 0.30 | 0.12 | 0.25 | B = 5 | 1080 | 6100 | 0.22 | $3.9 \times 10^{11}$ | 4580 |
| 33 | 0.30 | 0.12 | 0.25 | C = 2 | 1100 | 7040 | 0.61 | $3.3 \times 10^{11}$ | 4390 |
| 34 | 0.30 | 0.12 | 0.25 | C = 5 | 1080 | 6050 | 0.26 | $4.2 \times 10^{11}$ | 4610 |
| 35 | 0.30 | 0.12 | 0.25 | A = 5 | 1080 | 8310 | 0.32 | $4.0 \times 10^{11}$ | 4620 |
| 36 | 0.50 | 0.10 | 0.25 | | 1140 | 6320 | 2.67 | $2.0 \times 10^{11}$ | 2110 |

*Comparative Examples

EXAMPLE 1

Dielectric ceramic compositions were prepared from PbO, $La_2O_3$, $ZrO_2$, $TiO_2$, MgO, $Nb_2O_5$, NiO, $Fe_2O_3$, and $WO_3$ as the raw materials. Their mixing ratio defined by the values x, u, and v in the formula (I) is shown in Table 1. The weighed raw materials were mixed with a wet ball mill for 20 hours. The resulting mixture was dehydrated, dried, and calcined at 750° C. for 2 hours. The calcined mixture was pulverized again It is to be noted from Table 1 that the dielectric ceramic compositions defined by the invention have a high dielectric constant, a high insulation resistance, a high capacitance-resistance product, and a low dielectric loss, which are desirable for ceramic capacitors. In addition, the dielectric ceramic composition is capable of sintering at a low temperature. The sintering temperature can be lowered further by the incorporation of $Pb(Fe_{2/3}W_{1/3})O_3$, $Pb(Mg_{1/2}W_{1/2})O_3$, and/or $Pb(Ni_{1/2}W_{1/2})O_3$, without any adverse effect on insulation resistance.

What is claimed is:

1. A dielectric ceramic composition which comprises $(Pb,La)(Zr,Ti)O_3$ and $Pb(Mg_{1/3}Nb_{2/3})O_3$ in the ratio defined by the formula below, $$x(Pb_{1-u}La_u)(Zr_{1-v}Ti_v)O_3 \cdot (1-x)Pb(Mg_{1/3}Nb_{2/3})O_3$$

wherein
$1.0 \leqq u \leqq 0.28$
$0.25 \leqq v \leqq 1.00$
$0.03 \leqq x \leqq 0.50$.

2. A dielectric ceramic composition set forth in claim 1, which further comprises $Pb(Fe_{2/3}W_{1/3})O_3$ in an amount of up to 9 mol%.

3. A dielectric ceramic composition set forth in claim 1, which further comprises one of $Pb(Mg_{1/2}W_{1/2})O_3$, $Pb(Ni_{1/2}W_{1/2})O_3$, $Pb(Mg_{1/2}W_{1/2})O_3 \cdot Pb(Ni_{1/2}W_{1/2})O_3$, $Pb(Mg_{1/2}W_{1/2})O_3 \cdot Pb(Fe_{2/3}W_{1/3})O_3$, $Pb(Ni_{1/2}W_{1/2})O_3 \cdot Pb(Fe_{2/3}W_{1/3})O_3$, and $Pb(Mg_{1/2}W_{1/2})O_3 \cdot Pb(Ni_{1/2}W_{1/2})O_3 \cdot Pb(Fe_{2/3}W_{1/3})O_3$ in an amount of less than 5 mol% in total.

4. A dielectric ceramic composition set forth in claim 1, wherein the value of u in the formula is defined by $0.10 \leqq u \leqq 0.25$.

5. A dielectric ceramic composition set forth in claim 1, wherein the value of v in the formula is defined by $0.30 \leqq v \leqq 1.00$.

6. A dielectric ceramic composition set forth in claim 1, wherein the value of x in the formula is defined by $0.03 \leqq x \leqq 0.40$.

7. A dielectric ceramic composition set forth in claim 2, wherein the amount of $Pb(Fe_{2/3}W_{1/3})O_3$ is up to 8 mol%.

8. A dielectric ceramic composition set forth in claim 3, wherein the total amount of one of $Pb(Mg_{1/2}W_{1/2})O_3$, $Pb(Ni_{1/2}W_{1/2})O_3$, $Pb(Mg_{1/2}W_{1/2})O_3 \cdot Pb(Ni_{1/2}W_{1/2})O_3$, $Pb(Mg_{1/2}W_{1/2})O_3 \cdot Pb(Fe_{2/3}W_{1/3})O_3$, $Pb(Ni_{1/2}W_{1/2})O_3 \cdot Pb(Fe_{2/3}W_{1/3})O_3$, and $Pb(Mg_{1/2}W_{1/2})O_3 \cdot Pb(Ni_{1/2}W_{1/2})O_3 \cdot Pb(Fe_{2/3}W_{1/3})O_3$ is up to 4 mol%.

* * * * *